No. 622,771.  F. LEHTO.  Patented Apr. 11, 1899.
RAMROD.
(Application filed Oct. 21, 1898.)
(No Model.)
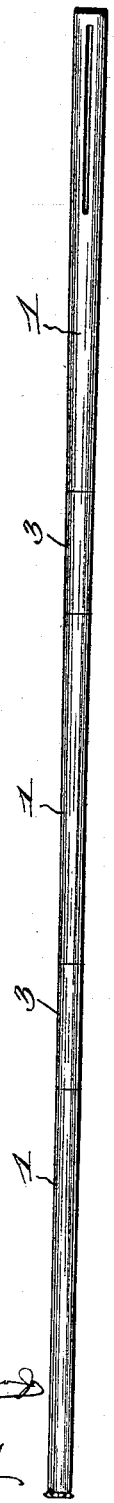

UNITED STATES PATENT OFFICE.

FRED LEHTO, OF SCOFIELD, UTAH.

RAMROD.

SPECIFICATION forming part of Letters Patent No. 622,771, dated April 11, 1899.

Application filed October 21, 1898. Serial No. 694,231. (No model.)

*To all whom it may concern:*

Be it known that I, FRED LEHTO, a citizen of the United States, residing at Scofield, in the county of Carbon and State of Utah, have invented a new and useful Ramrod, of which the following is a specification.

This invention relates to ramrods, and has for its object to provide a jointed rod which is capable of being folded into a comparatively small and compact space for storage or transportation and which may be quickly and easily assembled to provide as strong and durable a rod as the usual single-length rod.

To this end the invention consists in a certain new construction of folding joint which connects the several sections of the rod, all as hereinafter set forth and claimed.

In the drawings, Figure 1 is an elevation of the rod assembled together for use. Fig. 2 is an elevation of the device in folded position, one of the sleeves being removed. Fig. 3 is a longitudinal sectional view taken through the joint in assembled position. Fig. 4 is an enlarged detail view of the hinge connection removed.

Like numerals of reference indicate like and corresponding parts in all the figures of the drawings.

Referring to the drawings, 1 designates the several sections of the rod. Three sections are shown; but as many sections may be used as desired. The ends of the sections are reduced and threaded, as at 2, and are rigidly connected by means of hollow sleeves 3, which are internally threaded at each end and adapted to engage the threaded ends of the sections 1. The sleeves are of the same diameter as the sections, so as to form a smooth continuous unbroken rod.

The hinged connection comprises a rigid joint or link 4, having a pointed shank 5, whereby the link may be fixed to the end of one of the sections. An approximately U-shaped clip 6 is swiveled upon a suitable fixed joint or pin 7, fixed in the adjacent end of the next adjoining section. The stationary link 4 and the swiveled clip 6 are connected together by means of two links 8 and 9, respectively, of which the link 8, connected to the clip 6, is preferably shorter than the link 9, connected to the fixed link 4. The extreme ends of the links 8 and 9 are connected, respectively, to the swiveled clip and the fixed link by means of pins or rivets 10 and 11, the rivet 11 being slidably mounted within the slot 12 of the link 4. The intermediate ends of the links 8 and 9 are pivotally connected separately to permit of the fixed link 4 moving the entire distance between the side members of said links.

By reference to Fig. 3 it will be noted that when in assembled position the fixed link 4 is pushed inward and is seated between the links 8 and 9, and the sections are rigidly connected by means of the sleeve 3, which incases and protects the hinged joint and provides a strong and durable rod.

To fold the rod, as shown in Fig. 2, the sleeves are unscrewed from the section carrying the swiveled clip and the sections drawn apart to the entire extent of the slot 12 in the fixed link 4 and then folded back alongside one another, the short link 8 forming the hinge. It will now be understood why one link is formed shorter than the other to permit of the sections folding flat alongside of one another.

The sleeves are removably connected to each end of the sections, so as to facilitate the mounting of the several links, and the purpose of the swiveled clip is to permit of the links turning with the sleeve when being disconnected from one of the sections when it is desired to fold the device.

The construction and arrangement herein set forth provide a simple and useful form of ramrod in which changes in the form, proportion, and minor details of the hinged connection between the sections may be made without departing from the spirit and scope or sacrificing any of the advantages of the present invention.

Having thus described my invention, what I claim is—

1. In a folding ramrod, the combination with separate sections, of a rigid joint or link carried by one of the sections, a swiveled clip carried by the opposing end of the adjacent section, a flexible connection between the clip and the fixed link and slidable upon the latter, whereby either section may be folded in any desired direction, and connecting-sleeves for the sections, each sleeve inclosing its respective flexible connection and having a removable connection with adjacent sections, substantially as shown and described.

2. In a folding ramrod, the combination with separate sections, and connecting-sleeves for the said sections, of a rigid joint or link carried by one of the sections, a clip swiveled to the opposing end of the adjacent section, a pair of links pivoted at one end to the clip, the intermediate ends of the respective side members of the links being pivoted together independently, and the other end thereof having a pivotal connection with the rigid link and capable of sliding thereon, the side members of the loose links being separated from end to end to permit of the rigid link sliding therebetween, substantially as shown and described.

3. In a folding ramrod, the combination with separate sections, and sleeves for connecting the sections, of a rigid joint or link fixed to one section, and a pair of loosely-pivoted links connected at one end to the opposing end of the adjacent section, and slidably connected to the rigid link at the other end thereof, the link connected directly to the adjacent section being shorter than the other link, substantially as shown and described.

4. In a folding ramrod, the combination with separate sections, of fixed joints fitted to the ends of each section, and a flexible or hinged connection between the fixed joints of the opposing sections, the flexible connection being swiveled to one of the fixed joints and slidably mounted upon the other joint, whereby either section may be folded in any desired direction, and connecting-sleeves for the sections, each sleeve inclosing its respective flexible connection and having a removable connection with adjacent sections, substantially as shown and described.

5. In a folding ramrod, the combination with separate sections, of a flexible connection for the opposing ends of adjacent sections, and sleeves rigidly connecting the sections in extended position, each sleeve having a removable connection at both ends with adjacent sections, and the flexible connection permitting of an axial and a longitudinal movement of either section to connect or disconnect the sleeve, and a lateral or hinged movement to fold the sections, substantially as shown and described.

In testimony that I claim the foregoing as my own I have hereto affixed my signature in the presence of two witnesses.

FRED LEHTO.

Witnesses:
JOHN KORBS,
JAHAN JANSAN.